March 8, 1966   A. P. PCOLA   3,238,660
FISHING LURE
Filed June 9, 1964
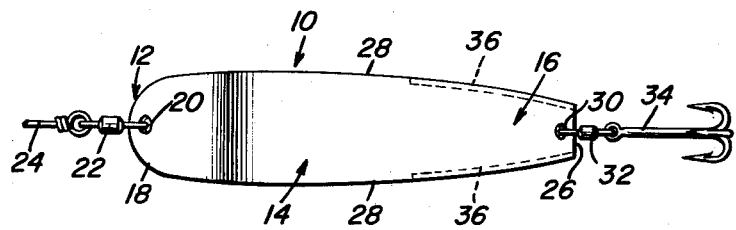
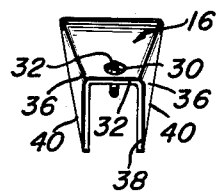
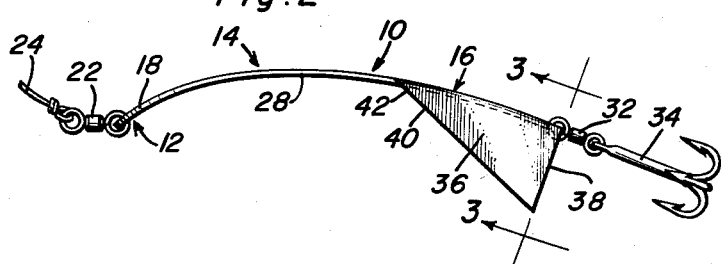
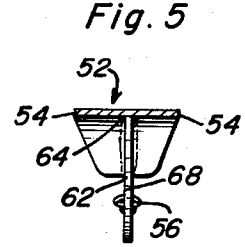
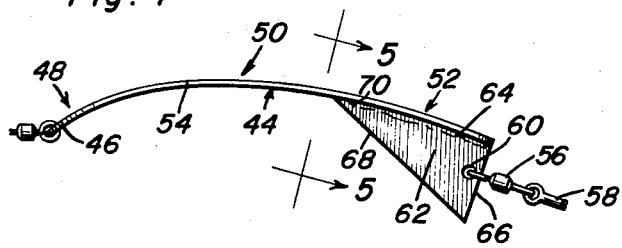
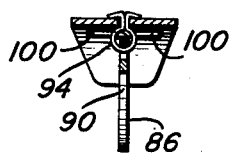
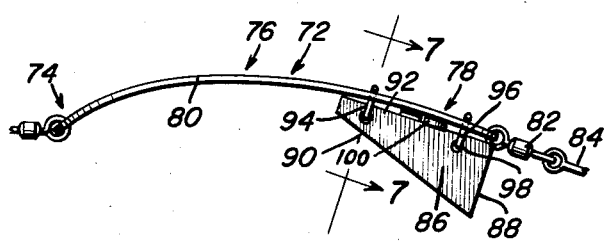
Andrew P. Pcola
INVENTOR.
BY *Clarence A. O'Brien*
*and Harvey B. Jacobson*
Attorneys United States Patent Office 3,238,660
Patented Mar. 8, 1966

3,238,660
FISHING LURE
Andrew P. Pcola, Box 61, St. Michael, Pa.
Filed June 9, 1964, Ser. No. 373,810
5 Claims. (Cl. 43—42.03)

This invention relates to a fishing lure for casting and trolling characterized by an elongated one piece blade or plate having cooperatively oriented head, body and tail portions, a fishing line linked to the tip of the head portion, and a fishhook linked to the trailing end of the tail portion.

Briefly, the blade or plate is generally ovate in plan, is bowed or arched longitudinally. The median or body portion is arched upwardly, the leading end or head is curved and dips downwardly, and the tail portion slopes rearwardly, gradually downwardly and is provided with novel lure steering rudder means.

In carrying out the improved concept the blade or plate is of uniform cross-sectional thickness from end to end. The dorsal and ventral surfaces are transversely planar and the longitudinal edges are without flanges and accordingly uninterruptedly smooth from forward to rearward ends. One or more flat-faced vanes are carried by and depend from the underneath side of the tail portion and constitute and provide the desired rudder-type guidance and control means.

One objective of the above described lure is to provide an alluring wobble action resembling and imitative of the swimming motion of a minnow and wherein, as a result thereof, and with the water flowing over the cambered and planar dorsal and ventral surfaces, the lure wobbles in an upwardly arched animated manner. With the overall shape, marginal delineation and components thus oriented, the action and motion, particularly the functioning of the downwardly dipping head, tends to maintain the lure below the water's surface. Accordingly, the thus constructed and lively performing lure can and does cope with rushing water and overcomes the undesirable tendency, found in prior art lures, to raise to and ride only on the surface of the water. Experimental use has shown that the herein disclosed lure retains its intended depth position and its unique wobble-along action in rushing water without spinning or rotating and undesirably twisting the line.

Another objective resides in the fact that the novel tail-end rudder means results in the lure assuming and maintaining the significant upwardly arched attitude and, with the cooperation of the round-ended dipping head portion, proper steering can be and is achieved. Also, the fact that this lure is cambered longitudinally only is pertinent inasmuch as this shape and the contributory steering function of the rudder means minimizes resistance to forward travel, whereby the desired upwardly arched self-wobbling behavior and attractive action is constant and assured.

In one embodiment two spaced parallel rudder-type vanes are fixed to longitudinal edges of the rearwardly downwardly sloping tail portion. In a second embodiment a single centralized fixed ruddering vane or fin is provided. And, in the third embodiment a single vane or rudder is hingedly attached and suspended lengthwise from the ventral surface midway between the longitudinal edges of the tail portion. The plate is alike in all embodiments and the chief distinction between them has to do with the distinguishably different rudder means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a fishing lure constructed in accordance with the present invention;

FIGURE 2 is a side or edge elevation of the same;

FIGURE 3 is an end view taken on the plane of the section line 3—3 of FIGURE 2;

FIGURE 4 is an edge or side elevation similar to FIG. 2 and showing a first modification of the lure;

FIGURE 5 is a section on the plane of the section line 5—5 of FIGURE 4;

FIGURE 6, like FIGS. 2 and 4, is a side or edge elevation but showing a second modification of the lure; and FIGURE 7 is a section on the plane of the vertical section line 7—7 of FIGURE 6.

Although the lure proper is the same in all forms of the invention, each form or embodiment will be separately described. With reference first to the form of the invention shown in FIGS. 1 to 3, inclusive, the lure proper is denoted by the numeral 10 and comprises an elongated plate or blade which is of uniform cross-sectional thickness from end to end. The plate is arched or bowed longitudinally and defines a head portion 12, a median body portion 14 and a complemental rearward tail portion 16. The tip or leading edge 18 of the head portion is arcuately rounded and is provided at the center and to the rear thereof with an opening or hole 20 with which one end of the swivel 22 is connected, the fishing line 24 being attached, as usual, to the swivel. The terminal or trailing end 26 of the tail portion is straight across; that is, at right angles to the longitudinal axis of the overall plate. The longitudinal edges 28 are flangeless and extend from end to end of the plate. The top and bottom sides are transversely planar and define dorsal and ventral surfaces. Accordingly, the convex dorsal surface provides the desired longitudinal camber. The dorsal surface of the head portion 12 is suitably curved and deflected downwardly to function as a suitable baffle and to cause the lure to dip and dive downwardly into the water which is being fished. The dorsal surface of the body portion is arched upwardly in the manner shown. The corresponding dorsal surface of the tail portion slopes rearwardly downwardly and the trailing end is provided centrally with a hole 30 for attachment of a suitable swivel 32 carrying the attached fishhook 34. The longitudinal edge portions of the tail portion 16 are provided with integral depending spaced vanes or fins 36 which are alike in construction. Each fin as shown in FIG. 2 is flat-faced and substantially triangulate in side elevation, the upper longitudinal edge being integral with the coacting portions of the edges 28. The trailing end or edge 38 may be straight as shown and terminates flush with the straight-across trailing end 26. The lower edge of each vane or fin slopes or inclines upwardly and forwardly as denoted at 40 and the apex of the triangle, denoted at 42, merges with the plate at the juncture of the body and tail portions 14 and 16, respectively.

The form or first modification shown in FIGS. 4 and 5 likewise comprises a plate or blade which is correspondingly ovate in plan, see FIG. 1, the plate being here denoted by the numeral 44. The round edged forward end portion 46 provides the desired head portion 48 which is coordinated with the median body portion 50 and oriented tail portion 52. The plate is longitudinally arched or bowed in the same manner illustrated in FIG. 2, provides a cambered dorsal surface at the top, a concaved ventral surface at the bottom. The edges 54 are flangeless. The fishing line (not detailed) is attached in the same manner shown in FIG. 1. The swivel 56 of the fishhook 58 is attached in this instance to a hole 60 provided therefor at the rearward end portion of the single depending rudder-type vane or fin 62. As shown in FIG. 5 the upper longitudinal edge portion of this elongated vane is fixedly welded or otherwise secured as at 64 to the lengthwise median portion of the ventral side. Hence, the vane is at right angles to the plate and depends vertically therefrom and is located approximately midway between the two edges 54. The rearward or terminal end of the vane is straight, as at 66, and terminates approximately flush with the trailing end of the tail portion. The lower longitudinal edge of the vane is inclined forwardly and upwardly as denoted at 68 and the apical end 70 terminates and merges into the central underneath side of the ventral surface at the juncture of the body and tail portions 50 and 52.

The blade-like plate of the third modification, FIGS. 6 and 7, is denoted at 72, is of uniform thickness or cross-section from end to end, is bowed or arched longitudinally the same as above described and provides a rounded lip head portion 74, median body portion 76 and gradually downwardly sloping tail portion 78. The flangeless longitudinal or lengthwise edge portions 80 range from end to end and the trailing end of the tail portion is again straight across (not detailed) in the manner illustrated at 26 in FIG. 1. The swivel 82 for the hook 84 is connected in the manner shown in FIG. 1. Whereas in FIG. 1 two opposed elongated triangulate vanes are employed and one triangulate vane is employed and fixed in FIGS. 4 and 5, a single similarly constructed approximately triangulate vane or fin is provided in this modification in FIGS. 6 and 7. The vane is denoted at 86, has a rear trailing straight end 88 substantially flush with the trailing end of the tail portion 78. The lower inclined edge here is denoted at 90 and inclines rearwardly and downwardly. The upper edge 92 instead of being fixed is hingedly attached and this is accomplished by using longitudinally attached eyes 94 and 96 which are attached and mounted on the median lengthwise portion of the tail portion as shown in FIG. 7. The vane is provided with holes 98 through which the cooperating portions of the rings or eye pass thus hingedly joining the vane to the mid-portion of the tail portion midway between the longitudinal edge portions. Although it is desired that the vane be permitted to swing laterally that is from side to side with respect to the longitudinal dimension of the lure the swinging action is limited by providing the upper edge with integral outwardly bent limit stop lugs 100. These lugs are bent outwardly and in opposite directions as shown in FIG. 7 and strike the underneath side of the ventral surface.

The lure proper in each of the forms of the invention described attains a lure wobbling action in an upwardly arched position with the water passing over the longitudinal cambered surface. The coordinated and properly oriented bends of the head, body and tail portions function to direct and hold the lure below the surface of the water. The tail portions with the attached rudder means cause the lure to take an upward arched position aided with the downwardly curved head portion and steering action of the rudder means. The arcuity of the longitudinal camber from end to end provides the shape and action desired.

In operation it will be apparent that the point of attachment of the line is at the center point of the line connecting swivel; that is, just rearwardly of the arcuately rounded leading edge of the downwardly curved head portion of the lure. This feature permits the cambered back or dorsal surface of the body portion to achieve maximum side-to-side wobble on its long axis. The flattened upwardly arched body portion in conjunction with the control action of the ruddering means (one or two vanes fixed or hinged) results in the lure assuming the upwardly arched wobbling attitude when the lure is trolled or pulled through the water being fished. The rudder means functions to steer the lure in the desired manner, the flangeless edges assist and the downwardly deflected head serves not only as a baffle but causes the lure to dip and dive downwardly as the water surges rearwardly atop the body and tail portions. The behavior pattern thus achieved and simulating a swimming minnow, effectively attracts and catches fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing lure comprising an elongated rigid plate substantially ovate in plan and embodying united head, body and tail portions, said plate being arcuately bowed from one end to the other end and providing a convex dorsal surface and a concave ventral surface, and rudder means carried by said tail portion and embodying a vane, the latter being lateral to and depending below said ventral surface, said vane being substantially triangulate in side elevation, having an upper longitudinal edge joined to a median lengthwise surface of said concave ventral surface, having a bottom edge inclined rearwardly and downwardly, a generally apical forward end merging into and integrally joined with said plate, and a straight rearward end terminating proximal to the corresponding rearward end of said tail portion, said vane being spaced midway between the longitudinal edges of said tail portion and of a length commensurate with said tail portion.

2. A fishing lure comprising an elongated rigid plate substantially ovate in plan and embodying united head, body and tail portions, said plate being arcuately bowed from one end to the other end and providing a convex dorsal surface and a concave ventral surface, and rudder means carried by said tail portion and embodying a vane, the latter being lateral to and depending below said ventral surface, said vane being substantially triangulate in side elevation having an upper longitudinal edge hingedly joined to a median underneath side of said ventral surface, having a bottom longitudinal edge inclined rearwardly and downwardly, a generally apical forward end terminating adjacent to said plate, and a rearward end terminating proximal to the corresponding rearward end of said tail portion.

3. A fishing lure comprising an elongated rigid plate substantially ovate in plan, of uniform thickness from end to end, and defining united head, body and tail portions, said plate being arcuately bowed from one end to the other end and providing a convex dorsal surface and a concave ventral surface, said dorsal surface providing a longitudinal camber ranging lengthwise from the forward to the rearward end of said plate, both dorsal and ventral surfaces being transversely straight, the longitudinal edges of said plate being slightly curved and uninterruptedly constant, the leading end of said head portion being arcuately rounded, the trailing end of said tail portion being straight across and at approximate right angles to said longitudinal edges, and rudder means carried by said tail portion, said rudder means comprising a pair of spaced parallel rigid duplicate vanes each generally triangular in side elevation having upper longitudinal edges joined to coextensive portions of the respectively opposite longitudinal edges of said tail portion, depending at right angles below the plane of the adjacent ventral surface, the rear vertical ends of said vanes terminating flush with the straight across trailing end of said tail portion, the bottom edges inclining forwardly upwardly and the apical ends merging with the adjacent longitudinal edges of said plate, said vanes being of a length precisely equal to the length of the tail portion only.

4. A fishing lure comprising an elongated rigid plate substantially ovate in plan, of uniform thickness from end to end, and defining united head, body and tail portions, said plate being arcuately bowed from one end to the other end and providing a convex dorsal surface and a concave ventral surface, said dorsal surface providing a longitudinal camber ranging lengthwise from the forward to the rearward end of said plate, both dorsal and ventral surfaces being transversely straight, the longitudinal edges of said plate being slightly curved and uninterruptedly constant, the leading end of said head portion being arcuately rounded, the trailing end of said tail portion being straight across and at approximate right angles to said longitudinal edges, and rudder means carried by said tail portion, said rudder means comprising a single rigid vane having an upper longitudinal edge affixed lengthwise to the ventral portion of said tail portion and depending at right angles therefrom and situated midway between the respective longitudinal edges of said tail portion, said vane being generally triangulate in side elevation, having its rear vertical end proximal to the trailing end of said tail portion, the lower longitudinal edge slanting forwardly and upwardly toward and merging with said ventral surface, said vane being limited in length and having the same length as said tail portion.

5. A fishing lure comprising an elongated rigid plate substantially ovate in plan, of uniform thickness from end to end, and defining united head, body and tail portions, said plate being arcuately bowed from one end to the other end and providing a convex dorsal surface and a concave ventral surface, said dorsal surface providing a longitudinal camber ranging lengthwise from the forward to the rearward end of said plate, both dorsal and ventral surfaces being transversely straight, the longitudinal edges of said plate being slightly curved and uninterruptedly constant, the leading end of said head portion being arcuately rounded, the trailing end of said tail portion being straight across and at approximate right angles to said longitudinal edges, and rudder means carried by said tail portion, said rudder means comprising an elongated rigid generally triangular vane having an upper longitudinal edge hinged at points to the coacting ventral surface, the hinge points being midway between the adjacent longitudinal edge portions, said upper edge having lateral outstanding stop lugs engageable with said ventral surface and serving to limit the lateral swinging action of said vanes.

References Cited by the Examiner

UNITED STATES PATENTS

| | | | |
|---|---|---|---|
| 1,464,041 | 8/1923 | Holcomb | 43—42.5 |
| 1,755,647 | 4/1930 | Harvey | 43—42.18 |
| 1,774,976 | 9/1930 | Huntington | 43—42.52 |
| 1,993,114 | 3/1935 | Rasmussen | 43—43.13 |
| 2,566,029 | 8/1951 | Louthan | 43—43.13 |

FOREIGN PATENTS 188,958   3/1957   Austria.

SAMUEL KOREN, *Primary Examiner.*

RAYMOND L. HOLLISTER, *Assistant Examiner.*